United States Patent [19]

Haruyama et al.

[11] Patent Number: 4,763,814
[45] Date of Patent: Aug. 16, 1988

[54] FLUID FEEDING DEVICE

[75] Inventors: Kenzo Haruyama, Fujisawa; Kenichiro Tsuruga; Tadashi Yoshikawa, both of Chiba, all of Japan

[73] Assignees: Ishikawajima-Harima Jukogyo Kabushiki Kaisha; Ishikawajima Yuki Kabushiki Kaisha, both of Tokyo, Japan

[21] Appl. No.: 43,026

[22] Filed: Apr. 27, 1987

[51] Int. Cl.⁴ ............... B67D 5/64; G01F 11/06
[52] U.S. Cl. .................... 222/63; 222/175; 222/250; 222/318; 222/334; 239/446
[58] Field of Search ............... 239/153–154, 239/445–446; 222/52, 55, 63, 175, 250, 263, 325–327, 333–334, 361, 378, 380, 400.5, 443, 255, 309, 318

[56] References Cited

U.S. PATENT DOCUMENTS

| | | | |
|---|---|---|---|
| 1,529,918 | 3/1925 | Richards | 222/334 X |
| 1,871,291 | 8/1932 | Adams et al. | 222/333 |
| 2,699,271 | 1/1955 | Davis | 222/443 X |
| 2,702,657 | 2/1955 | Davis | 222/443 X |
| 3,901,449 | 8/1975 | Bochmann | 239/332 |
| 3,945,533 | 3/1976 | Otto | 222/334 X |
| 3,987,869 | 10/1976 | Bowers | 222/175 X |
| 4,257,540 | 3/1981 | Wegmann et al. | 222/262 |
| 4,651,897 | 3/1987 | Johnson | 222/55 |

OTHER PUBLICATIONS

Stewart-Warner Corporation, Alemite and Instrument Division, Catalogue No. 253, 1982; pp. 4, 5, 12, and 13.

Primary Examiner—Michael S. Huppert

[57] ABSTRACT

A fluid feeding device in which a battery, a DC motor and an electric pump are housed within a portable case. A fluid in a fluid container mounted on and communicated with the electric pump is discharged from a fluid discharge gun in a predetermined quantity or continuously. The fluid feeding device is compact in size and light in weight so that an operator can easily carry it in a wide range, whereby the fluid feeding device can be easily used at a high place or at a narrow place. The fluid feeding device is used, for instance, for feeding grease into mechanical bearings or the like.

2 Claims, 8 Drawing Sheets

FLUID FEEDING DEVICE

BACKGROUND OF THE INVENTION

The present invention relates to a portable fluid feeding device which is compact in size, light in weight and capable of feeding under pressure a fluid such as lubricating grease, other oil, a sealing agent or an adhesive agent at a predetermined quantity or continuously.

Figure 1:
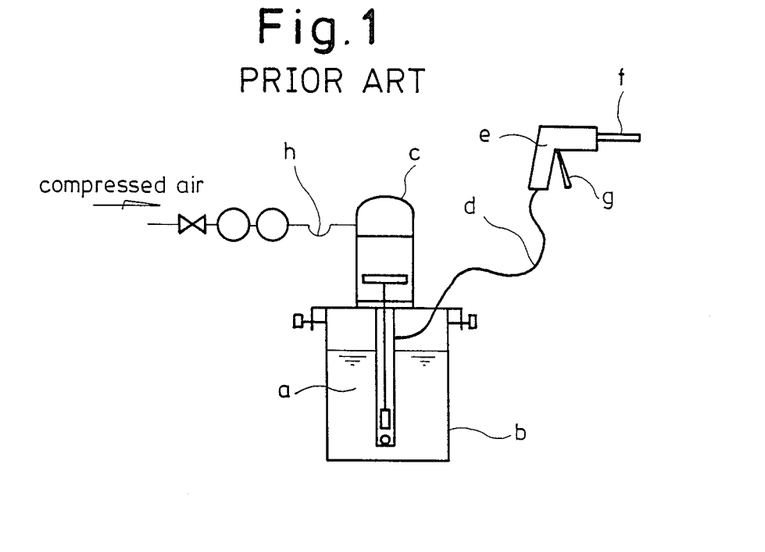
FIG. 1 shows a conventional grease feeding device.
Figure 2:
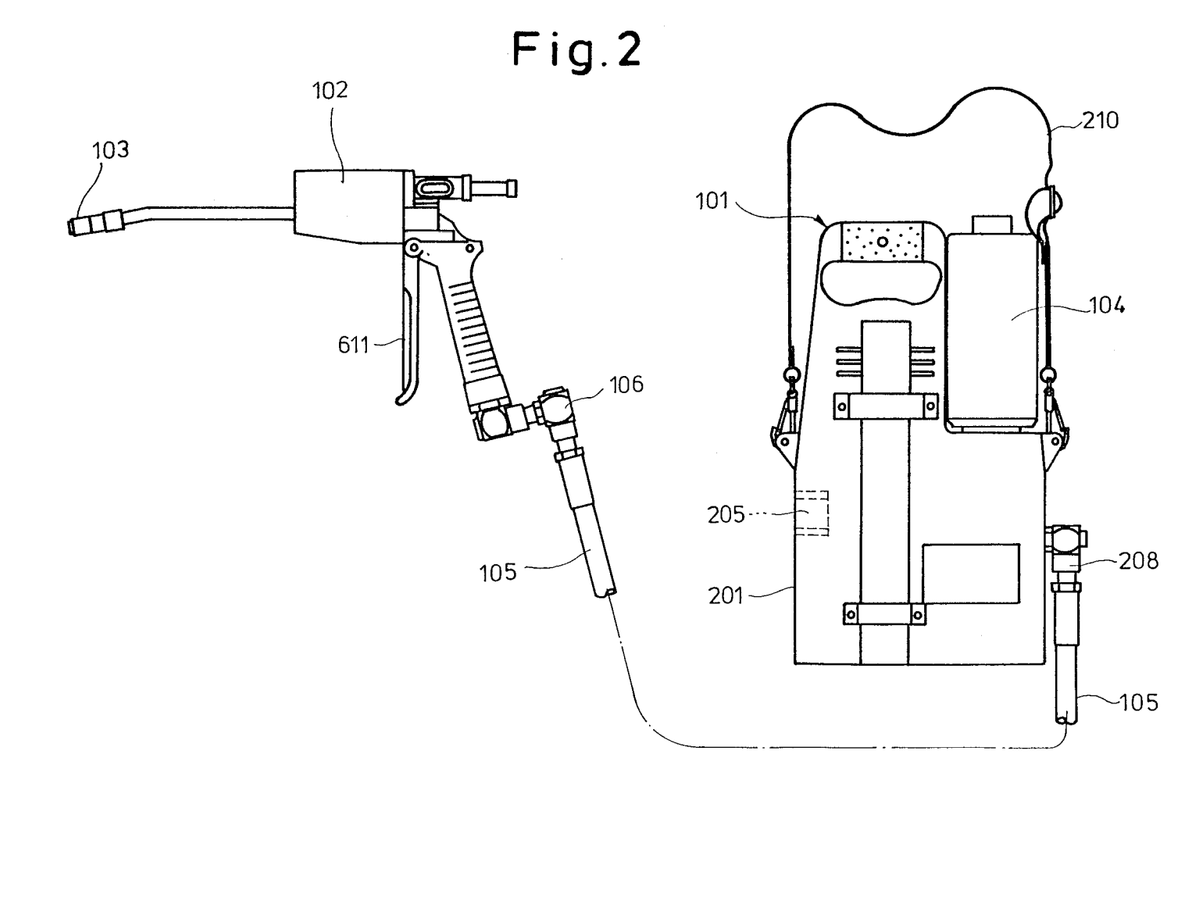
FIG. 2 is a schematic view used to explain the whole construction of a fluid feeding device in accordance with the present invention, including a pump case and a fluid dispensing gun.

FIG. 1 shows a conventional device for feeding grease to mechanical bearings in which a pneumatic pump c is mounted on a grease container b containing therein grease a. The pump c is connected at its discharge port to a grease hose d which in turn is connected to a grease gun e.

The grease gun e has a nozzle f which is connected, for instance, to a grease nipple on a mechanical bearing. When an operator grips the handle g on the grease gun e, compressed air is supplied from an air source such as a compressor through an air supply hose h to the pump c which in turn is so activated to feed grease a.

However, the conventional grease feeding device of the type has the following problems:

(i) Compressed air is needed to drive the pump c. The air hose h for charging the compressed air into the pump c is intercommunicated between the pump c and the compressed air source so that the range of displacement of the grease feeding device is limited by the length of the air supply hose h.

(ii) Inconveniently, it is almost impossible to carry the grease feeding device to a high place or a narrow place since the pump c is large in size and heavy in weight.

(iii) The grease gun e merely serves as a valve to selectively permit and interrupt the feed of grease and cannot measure a predetermined quantity of grease to be discharged.

The present invention was made to overcome the above and other problems encountered in the conventional fluid feeding devices and has for its object to provide a fluid feeding device in which an electric pump is driven by a self-contained battery and which is compact in size and light in weight so that it may be freely carried to any place.

Another object of the present invention is to provide a fluid feeding device in which a gun is equipped with a metering piston so as to repeatedly feed a predetermined quantity of fluid and starting and stopping the operation of the electric motor can be automatically controlled in response to the pressure of the fluid by means of a pressure switch.

To the above and other ends, the present invention provides a fluid feeding device comprising a portable battery, a DC motor driven by said battery, an electric pump driven by said DC motor, a power switch for said battery, a pressure switch responsive to a pressure of a fluid discharged from said electric pump for selectively energizing and de-energizing said DC motor, all of these components being accomodated in a postable case, a fluid container detachably mounted on said electric pump, and a fluid feeding gun communicated through a hose with said electric pump.

DETAILED DESCRIPTION OF THE PREFERRED EMBODIMENT

The present invention will be now described in detail with reference to a preferred embodiment thereof as shown in FIGS. 2 to 14. Reference numeral 101 represents a pump assembly comprising a liquid feeding or discharging gun 102 with a nozzle 103, a grease container 104 mounted on the pump assembly 101 and a grease hose 105 with a swivel joint 106 for communicating the pump assembly 101 with the gun 102.

Figure 3:
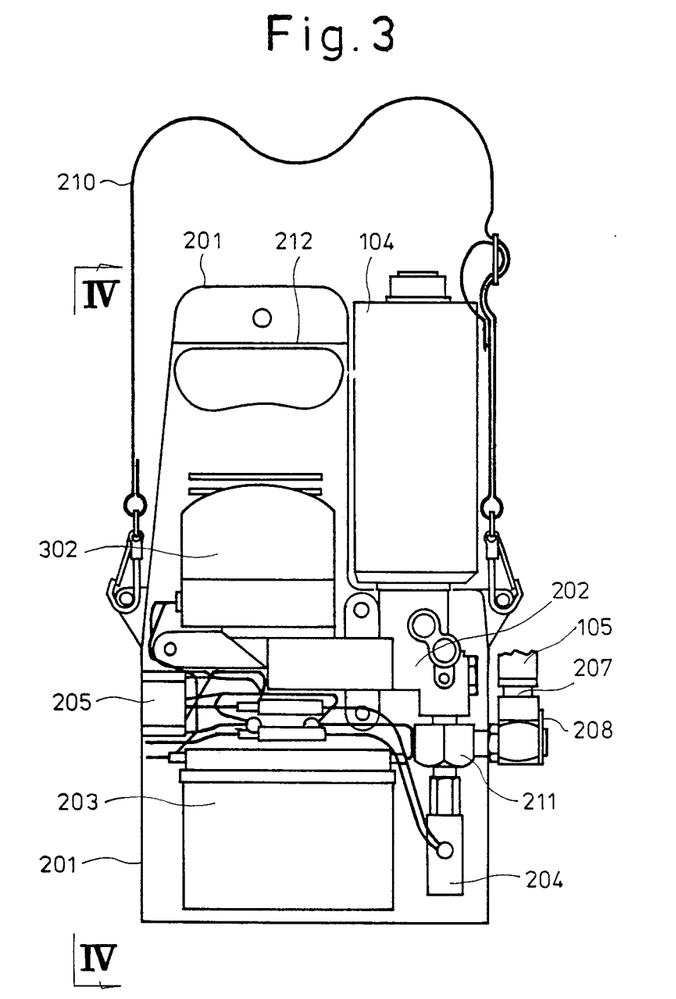
FIG. 3 shows in detail the interior of the pump case in FIG. 2.
Figure 4:
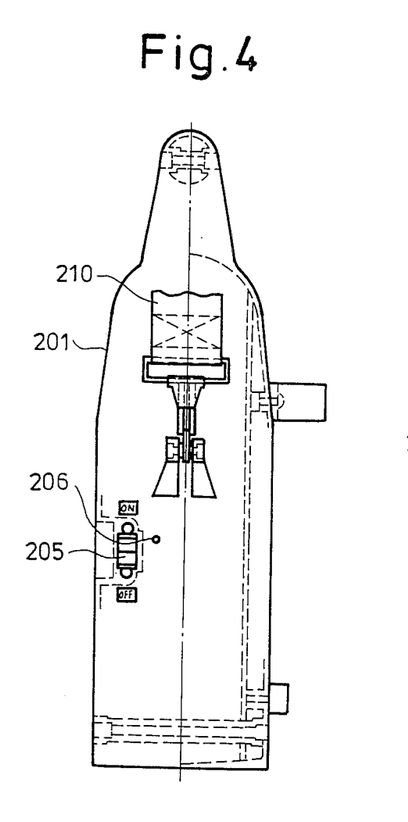
FIG. 4 is a front elevational view taken along the line IV—IV of FIG. 3.
Figure 5:
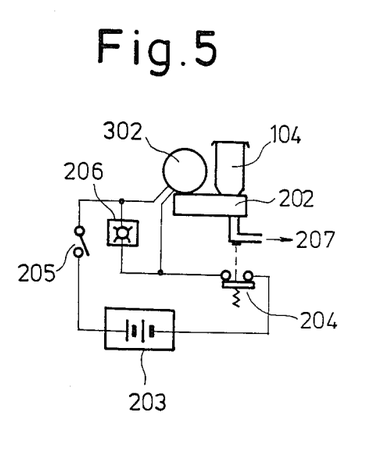
FIG. 5 is a partial circuit diagram of parts in the pump case shown in FIG. 3.

The pump assembly 101 comprises a pump case 201 which accomodates, as best shown in FIGS. 3 and 4, an electric pump 202, a battery 203, a pressure switch 204 connected to a hydraulic discharge line and a power switch 205. As best shown in FIG. 5, the battery 203 is electrically connected with a DC motor 302. The power switch 205 and the pressure switch 204 are inserted into the electric line which connects the battery 203 with the motor 302. A power supply lamp 206 incorporating a voltage detector is inserted in parallel with the electric line so as to display a residual voltage of the battery 203.

Figure 6:
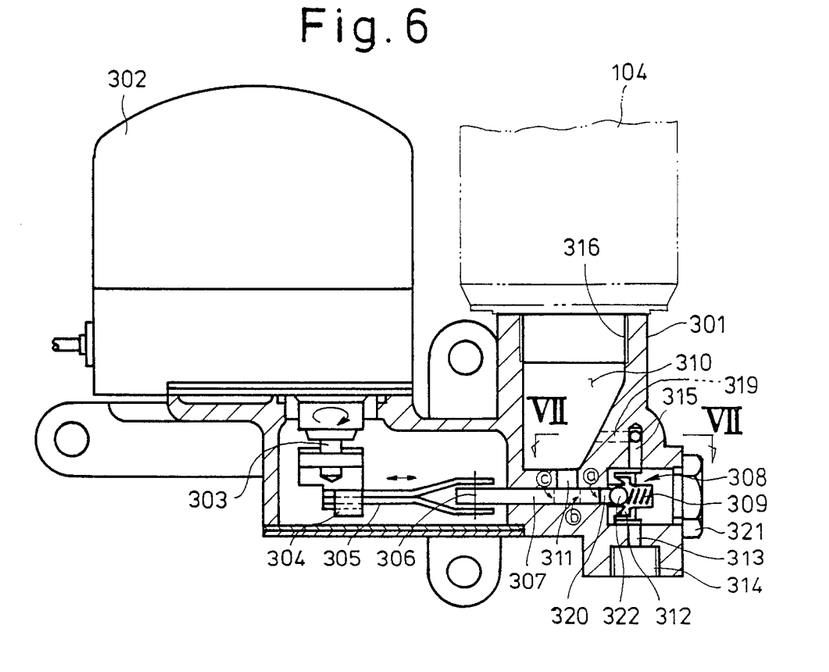
FIG. 6 shows in detail an electric pump shown in FIG. 3.
Figure 7:
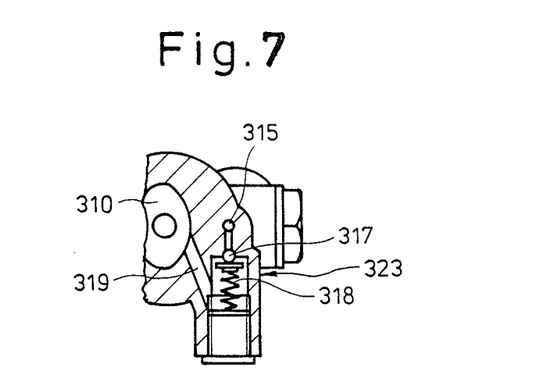
FIG. 7 is a sectional view taken along the line VII—VII of FIG. 6.

As best shown in FIG. 6, the electric pump 202 comprises a main body 301 to which is coupled the DC motor 302 having a reduction gear drivingly coupled thereto. A rotating shaft 303 of the reduction gear carries an eccentric cam 304 to which a connecting rod 305 is connected so as to be reciprocated in the axial direction thereof. The pump main body 301 has a mounting portion 316 for mounting the grease container 104. Grease in the grease container 104 is charged through grease suction ports 310 and 311 into a cylinder 320. A plunger 307 which is snugly and slidably fitted into the cylinder 320 is connected to the connecting rod 305 with a connecting pin 306. The head portion of the cylinder 320 is formed with a large-diameter bolt hole 312 and a bolt 321 with a discharge check valve 308 is threadably engaged with the bolt hole 312. When the DC motor 302 is de-energized or when the plunger 307 is in the suction stroke, a steel ball 322 of the check valve 308 is pressed against the cylinder 320 under the force of a spring 309 so that the reversal of the flow of grease can be prevented. When the plunger 307 is in the pushing stroke, the grease sucked in the cylinder 320 by the plunger 307 pushes the steel ball 322 and spring 309 so that grease flows through the space defined between the bolt 321 and the bolt hole 312 into a passage 313 and then is discharged from a discharge port 314. Furthermore, a relief valve 323 is disposed on the pump main body 301 and is adapted to be activated when the flow of grease on the downstream side of the discharge port 314 is interrupted for some reason. As best shown in FIG. 7, the relief valve 323 is interposed between a passage 315 in communication with the bolt hole 312 and a passage 319 in communication with the grease suction port 310 and is adapted to open or close the passage 315 by a steel ball 317 biased by a spring 318.

Figure 8:
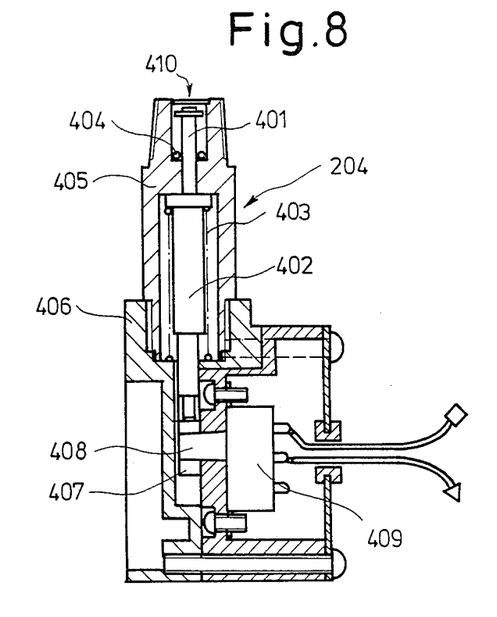
FIG. 8 shows in detail a pressure switch shown in FIG. 3.
Figure 9A:
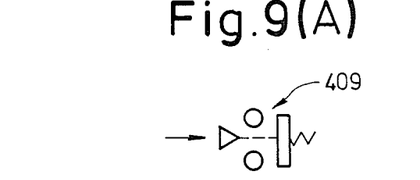
FIGS. 9(A) and 9(B) are views used to explain the mode of operation of the pressure switch shown in FIG. 8.
Figure 9B:
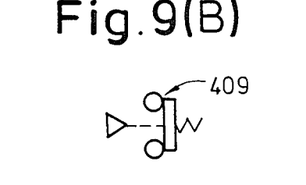

A cheese 211 having a T-shaped passage is attached to the discharge port 314 and a swivel joint 208 is communicated to one of the passages of the cheese 211 so that grease is fed into the grease hose 105 connected to the swivel joint 208. The pressure switch 204 is connected to the other passage of the cheese 211. As best shown in FIG. 8, the pressure switch 204 comprises a pressure switch main body 406 in which a slide switch 409 having a slide lever 408 is securely disposed. A push rod 402 biased under the force of a spring 403 in a cylindrical casing 405 is connected through a holder 407 in a perpendicular direction to the slide lever 408 so that the push rod 402 is pushed by a pressure pin 401 which receives the pressure of grease flowing through an inlet 410. It follows therefore that when the pressure of grease is high, the pressure pin 401 and the push rod 402 are pushed so that the slide switch 409 is switched to the "OFF" state as shown in FIG. 9(A) and consequently the DC motor 302 is de-energized. On the other hand, when the pressure of grease drops, the push rod 402 is returned to its initial position under the force of the spring 403 so that the slide switch 409 is switched to the "ON" state as shown in FIG. 9(B) and consequently the pump 202 is driven.

Figure 10:
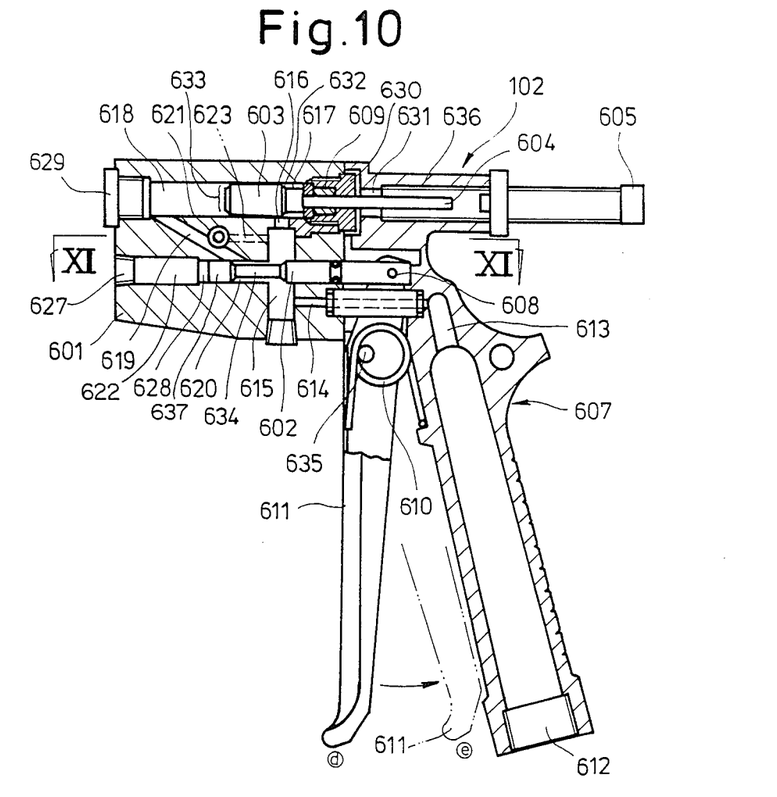
FIG. 10 shows in detail a fluid feeding gun capable of feeding a fluid in a predetermined quantity and shown in FIG. 2.

Referring next to FIGS. 10 to 13, the gun 102 capable of charging or feeding a fluid in a predetermined quantity will be described. Referring first to FIG. 10, a main body 601 has a metering cylinder 618 and a pilot cylinder 628 which extend in parallel with each other and into which are snugly and slidably fitted a metering piston 603 and a pilot piston 602, respectively.

The left end in FIG. 10 of the metering cylinder 618 is closed by a plug 629 while the right end thereof is closed by a sleeve 630. An indicating rod 604 extends from the right end in FIG. 10 of the metering piston 603 coaxially thereof into the sleeve 630 through a packing 609. A fluid-quantity control screw 605 is screwed into the cap 636 through the right end in FIG. 10 thereof so that the stroke of the metering piston 603 can be maintained at a predetermined length in response to the length of the adjusting screw 605 extended into the cap 636. Pressure receiving surface 632 at the right end in FIG. 10 of the metering piston 603 is equal in area to the cross sectional area of the metering piston 603 minus the cross sectional area of the indicating rod 604 while pressure receiving area 633 of the left end in FIG. 10 of the metering piston 603 is large and equal to the cross sectional area of the metering piston 603.

The pilot piston 602 is in the form of a stepped piston and has an intermediate small-diameter portion 634 and its right end in FIG. 10 is connected to a handle 611 with a pin 608. The handle 611 is pivoted with a pivot pin 635 to a grip 607 integral with the main body 601 and is normally biased in the clockwise direction under the force of a spring 610 and is maintained in the position indicated by the solid lines so that the pilot piston 602 is pulled toward the right in FIG. 10 and is maintained in position ⓓ shown in FIG. 12.

The main body 601 has a discharge port 627 which in turn is communicated with the left end in FIG. 10 of the pilot cylinder 628 and is connected to the nozzle 103.

The grip 607 has a grease feed port 612 which in turn is communicated through the swivel joint 106 with the hose 105 so that grease under pressure is normally supplied. The grease feed port 612 is communicated through passages 613, 614 and 615 with a passage 620 defined around the small diameter portion 634 of the pilot cylinder 628 (See FIG. 10) and is further communicated through a passage 616 with a space 617 adjacent to the pressure receiving surface 632 of the metering piston 603 and on the side of the rod 604.

The main body 601 further includes a passage 619 which communicates with the metering cylinder 618 on the side of the large pressure receiving surface 633 of the metering piston 618. When the handle is at the position ⓔ to maintain the pilot piston 602 in a first position indicated in FIG. 12, the passage 619 is communicated with the grease supply port 612 through passage 620 defined around the small-diameter portion 634 of the pilot piston 602 in the pilot cylinder 628. However, when the handle 611 is swung against the spring 610 in the counterclockwise direction to the position ⓔ indicated by the two-dot chain lines in FIG. 10, the pilot piston 602 is displaced toward the left in FIG. 10 and is maintained at its second position shown in FIG. 13. Then the right end in FIG. 10 of the pilot cylinder 628 is closed while the left end thereof is opened. Then, the passage 619 is disconnected from the grease feed port 612, but is communicated through the passage 622 with the discharge port 627.

Figure 11:
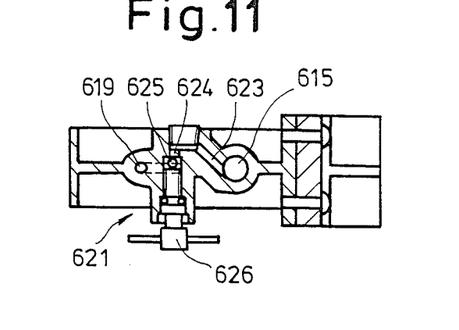
FIG. 11 is a sectional view taken along the line XI—XI of FIG. 10.
Figure 12:
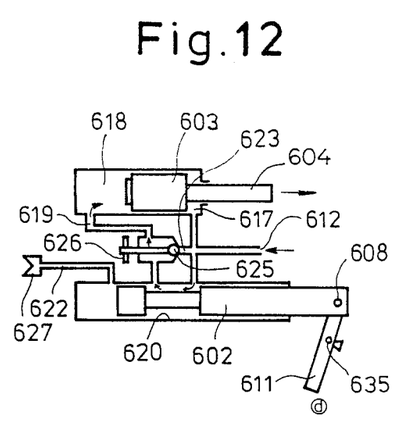
FIG. 12 shows a hydraulic circuit diagram when the fluid feeding gun shown in FIG. 2 is ready to discharge a fluid.

Shortcut passages 623 and 624 intercommunicate between the passages 615 and 619. Furthermore, there is provided a continuous discharge valve 621. When a valve handle 626 of the valve 621 is tightened, a steel ball 625 closes the shortcut passage 624 as shown in FIG. 11 while when the handle 626 is loosened, the steel ball 625 is moved away to open the shortcut passage 623 so that the passages 615 and 619 are intercommunicated with each other.

Figure 14:
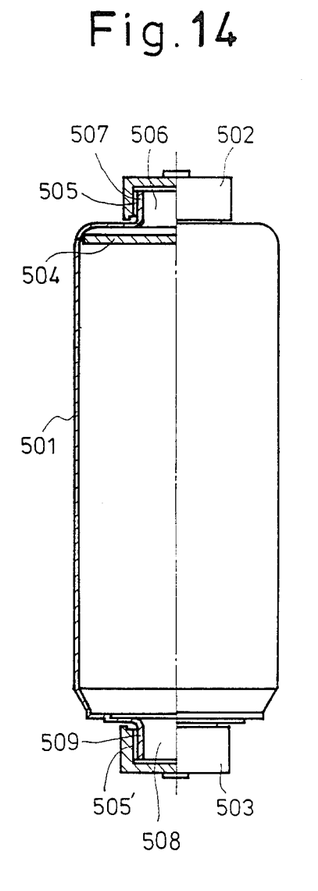
FIG. 14 is a detailed view of grease container shown in FIG. 2.

FIG. 14 shows the grease container 104 which comprises a cylindrical main body 501 made of a synthetic resin such as polyethylene, nylon or the like so that grease or the like filled in the main body 501 can be visually observed from the exterior. Projections 507 and 509 extend respectively from the upper and lower ends of the main body 501 and are externally threaded to have male screws 505 and 505' respectively around the cylindrical outer surfaces thereof for engagement with internally threaded female screws of caps 502 and 503 respectively so that the grease container 104 is mounted on the mounting portion 316 of the pump main body 301 (See FIG. 6). The projections 507 and 509 have openings 506 and 508 which are closed respectively with the caps 502 and 503 or blind caps. When the openings 506 and 508 are closed with the blind caps, the grease container 104 can be used as a storage container.

Furthermore, a follower plate 504 made of sponge or the like is disposed in the main body 501 so as to cover the upper surface of the body of grease filled in the container 104. The follower plate 504 is shrunked in size to such an extent that it may be inserted through the opening 506 into the main body 501 and then is displaced downwardly by means of a rod or the like. Thereafter, grease is gradually filled into the main body 501 from the opening 508 to the opposite opening 506.

Reference numeral 210 represent a strap; 212, a handle; and 404, a seal.

Next the mode of feeding grease to a mechanical bearing by the device in accordance with the present invention will be described.

First the cap 503 or the blind cap on the side of grease of the grease container 104 is removed and the male screw 505' is threadably engaged with the mounting portion 316 of the pump assembly 101 so that the interior of the grease container 104 is communicated with the surrounding atmosphere through the cap 502 on the side of the follower plate 504.

When the power switch 205 is turned on, the DC motor 302 for driving the electric pump 202 is rotated by the electric energy supplied from the battery 203. The rotation of the motor 302 is reduced in rotational speed by the reduction gear and is transmitted to the rotating shaft 303. Then the eccentric cam 304 carried by the rotating shaft 303 makes crank motion so that the connecting rod 305 is reciprocated and consequently the plunger 307 connected with the connecting pin 306 to the connecting rod 305 is also reciprocated. When the plunger 307 is returning to the position ⓒ, grease is sucked into the cylinder 320 through the grease suction ports 310 and 311 in communication with the grease container 104. When the plunger 307 is moved from the position ⓑ to the position ⓐ, grease pushes the steel ball 322 and spring 309 of the check valve 308 and flows through the passage 313 to the discharge port 314. Thereafter, grease is forced to flow through the cheese 211, the discharge port of the swivel joint 208 and the hose 105 into the gun 102.

The grease flows through the grease supply port 612, the passages 613, 614, 615, 620 and 619 in the order named into the metering cylinder 618. Then grease charged in the metering cylinder 618 pushes the pressure receiving surface 633 on the side of the head of the metering piston 603, pushing the same. Concurrently, the charged grease flows through the passage 616 into the metering cylinder 618 on the side of the rod 617. The cross sectional area of the pressure receiving surface 632 on the side of the rod of the metering piston is smaller than the cross sectional area of the pressure receiving surface 633 on the side of the head, so that when the same pressure acts on the pressure receiving surfaces 632 and 633, the metering rod 604 is forced to move toward the side of the smaller cross sectional area (See FIG. 12).

When the metering piston 603 reaches the end of its stroke on the side of the rod, the flow of grease is interrupted so that the pump pressure is increased. Grease flows through the cheese 211 at the pump discharge port 314 into the inlet port 410 of the pressure switch 204. When the pressure of grease acts on the pressure pin 401, the push rod 402 is pushed downwardly so that the switch lever 408 connected with the push rod 402 is forced to slide, thereby opening the contacts of the slide switch 409 (See FIG. 9(A)). Then, the electrical ineterconnection between the battery 203 and the DC motor 302 is interrupted so that the motor-driven pump 202 is stopped.

Figure 13:
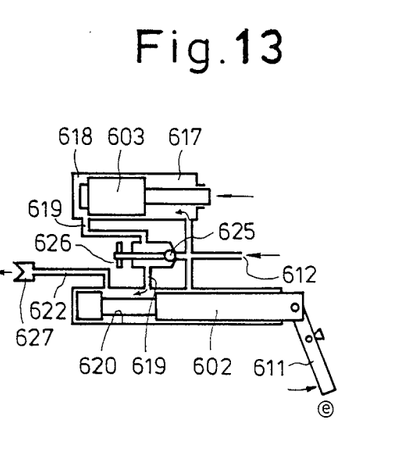
FIG. 13 is a hydraulic circuit diagram of the fluid feeding gun when the latter is discharging or feeding a fluid.

When the nozzle 103 is pushed against a grease nipple (not shown) and the handle 611 of the gun 102 is pulled, the pilot piston 602 is displaced as shown in FIG. 13. Then, grease under pressure flows through the grease supply port 612 into the right-hand portion of metering cylinder 618 on the side of the rod 617 and pushes the metering piston 603 toward the plug 629 so that grease charged into the left-hand portion of metering cylinder 618 is forced to flow through the passages 619, 620 622 and 627 to the nozzle 103.

When the metering piston 603 reaches the end of its stroke at plug 629, no grease flows. That is, the volume of the metering cylinder 618 is equal to the volume of grease discharged when the handle 611 is pulled one time.

Since the volume of the cylinder 618 and thus the grease discharge varies in response to the variation of the stroke of the metering piston 603, the discharge of grease can be adjusted by varying the displacement of the indicating rod 604 connected to the metering piston 603 by the discharge-volume adjusting screw 605.

The continuous-discharge valve 621 is provided in order to permit the continuous discharge of grease by the pump 202. When the valve handle 626 is loosened, grease flows through the passages 615, 623 and 624 and the seat of the steel ball 625 into the passage 619. When the handle 611 is pulled so that the circuit as shown in FIG. 13 is established, grease continuously flows through the passage 620 toward the discharge port 627.

When a predetermined quantity of grease is discharged through the discharge port 627 of the gun 102, the pressures in the passages 615 and 613 become lower so that the push rod 402 of the pressure switch 204 incorporated in the pump assembly 101 is returned to its upward position under the force of the spring 403. in this case, the switch lever 408 is pulled so that the contacts of the slide switch 409 are closed (See FIG. 9(B)). As a result, the electrical interconnection between the battery 203 and the DC motor 302 is reestablished so that the DC motor is energized and grease is discharged in the manner described.

That is, the energization or de-energization of the electric pump 202 is automatically made in response to the discharge of a predetermined quantity of grease by operating the handle of the grease gun 102 so that it is not needed to turn on or off the power switch 205.

The relief valve 323 is provided so that even when the pressure switch 204 is damaged and consequently the electric pump 202 is not de-energized and the pressure is increased, the fluid feeding device is not damaged. That is, when the pressure of grease in the communication passage 315 in communication with the discharge port 314 rises abnormally, the abnormally high pressure pushes the steel ball 317 down against the spring 318 so that grease flows through the passage 319 into the grease suction port 310.

The residual voltage of the battery 203 can be checked by the power supply lamp 206 so that the voltage drop can be checked.

When grease in the grease container 104 is consumed and its surface level drops, the follower plate 504 also moves down so that no grease remains at the bottom of the grease container 104. Since the grease container 104 can be fabricated at a low cost, it may be a disposable cartridge tank; but it may be used as may times as desired when grease is refilled into the grease container 104 from the side of the cap 503.

It is to be understood that the present invention is not limited to the preferred embodiment described above and that various variations and modifications may be effected within the spirit and scope of the present invention as described hereinabove and as defined in the appended claims. For instance, in addition to the supply of grease, the fluid feeding device in accordance with the present invention may be used to supply other oils, sealing agents, adhesive agents or the like under pressure. A fluid to be used can be supplied in a predetermined quantity or continuously.

As described above, the fluid feeding device in accordance with the present invention has the following excellent effects:

(I) Since the battery is accommodated in the pump case, an electric power line extended from an exterior power supply as well as a compressed air supply hose can be eliminated so that the fluid feeding device in accordance with the present invention can be freely carried to any desired place;

(II) The electric pump is selectively driven and stopped in response to actuation of the pressure switch so that the operating for turning on or off the power switch can be eliminated and the operation of the electric pump can be carried out in response to the discharge of a fluid such as grease. That is, when the fluid is discharged from the gun and when the fluid flows into the gun, the electric pump is driven; but it is stopped unless the handle of the gun is pulled;

(III) When a quantity of discharge of a fluid is adjusted previously by the metering piston, the gun discharges only a predetermined quantity of a fluid in one time so that, for example, a suitable quantity of grease can be fed into a bearing in an efficient manner without any waste of grease;

(IV) The gun in accordance with the present invention is equipped with the continuous-discharge valve so that when the latter is loosened, it becomes possible to continuously discharge a fluid from the gun;

(V) An operator can shoulder the pump assembly and grease container which are heavy in weight while handling the gun with one hand so that the fluid feeding device in accordance with the present invention can be carried freely to a high place or a narrow place and can be operated safely.

What is claimed is:

1. A device for dispensing a fluid, comprising:

a portable case provided with a battery, a DC motor, an electrical pump having a plunger adapted to be reciprocated by said DC motor, a container for a fluid detachably mounted to said casing, a pressure switch, a fluid passage from said container to a discharge port at said casing; and an electric circuit connecting said battery, said DC motor, said electrical pump and said pressure switch such that in response to a pressure drop in said passage said switch closes said circuit to thereby cause said battery to energize said motor to drive said pump to feed fluid from said container into said fluid passage;

a fluid dispensing gun;

and a hose leading from said discharge port to a fluid inlet at said dispensing gun;

said dispensing gun having a fluid dispensing nozzle, a metering piston and a pilot piston;

said metering piston being reciprocable in a metering cylinder and having a first end face and a second end face; a piston rod connected to said metering piston so as to define a second end face smaller than said first end face; an adjustable abutment engageable by said piston rod for adjusting the stroke of said piston and thereby the size of a metering chamber in said metering cylinder adjacent said first end face; first passage means communicating said fluid inlet with said metering chamber; second passage means communicating said fluid inlet and said metering cylinder adjacent said second end face;

said pilot piston being positioned between said dispensing nozzle and said first and second passage means and moveable between a first position in which said pilot piston interrupts communication between said metering chamber and said dispensing nozzle and permits filling of said metering chamber with fluid from said chamber until said piston rod engages said abutment, and a second position in which said pilot piston opens communication between said metering chamber and said dispensing nozzle and permits fluid from said container to enter said metering cylinder adjacent said second face and move said metering piston to empty the metered amount of fluid in said metering chamber through said dispensing nozzle; and a handle for displacing said pilot piston from said first to said second position and vice versa.

2. A device according to claim 1, comprising a shoulder band connected to said case for carrying said device.

* * * * *